Patented Jan. 30, 1934

1,945,345

UNITED STATES PATENT OFFICE 1,945,345

IMPROVED CHEESE PRODUCT AND PROCESS FOR PRODUCING THE SAME

Albert K. Epstein and Benjamin R. Harris, Chicago, Ill.

No Drawing. Application August 15, 1930
Serial No. 475,632

14 Claims. (Cl. 99—11)

Our invention relates to an improved cheese product and the process for producing the same.

The treatment of cheese to improve the keeping qualities thereof is well known. This treatment varies somewhat in the type of cheese treated. The Cheddar type of cheese, for example, is generally improved as far as its keeping qualities are concerned, by pasteurizing or sterilizing it as it is sometimes called, by means of heat. It is unquestionable that this treatment does actually increase the duration of time that this type of cheese can be satisfactorily kept; but unfortunately the disagreeable feature attending such treatment is that the aromatic substances having an effect on flavor and odor are largely driven off during the heating period, with the result that the treated cheese is apt to have an inferior taste and odor. Attempts have been made to overcome this disadvantage by blending different types of cheese, but these attempts have not been attended with complete satisfaction.

In the case of cheese such as cottage cheese the whey is removed and the curds washed for the purpose of improving the keeping qualities of the cheese. Since the flavoring substances are mostly water soluble in this type of cheese, this treatment has a tendency to leave the cottage cheese flat and tasteless.

In any of these types of cheese the treatment to increase the keeping qualities may be carried out in such a way as to leave some of the microorganisms and enzymes present for the purpose of either maintaining the flavor, or substantially producing a better flavor by the action of the retained organisms or enzymes. We have found that this is not a satisfactory solution to the difficulties involved because the ripening processes will then be continued beyond the desired point. In the Cheddar type of cheese this may result in the production of a very sharp odor and flavor, thus overshadowing and masking the very fine and pleasant aroma which is desired in this type of cheese. In the case of cottage cheese, the continued development of lactic acid organisms will produce a very strong flavor and the organisms may actually destroy the flavoring substances which have been produced during the fermentation and ripening.

The principal object of our present invention is to improve processes for treating cheese.

Another object is to arrest the ripening action of the cheese and still obtain a very fine flavor.

Another object is to improve the flavor of all types of cheese.

Another object is to simulate and increase where necessary, the finest types of taste and odor developed in the best types of cheeses at their most satisfactory stage of ripeness.

Generally, our invention is accomplished by treating the cheese to arrest the ripening action thereof in a suitable way, and subsequently to introduce into the cheese a flavoring substance of an improved character and produced to simulate the finest type of cheese flavor. In general, the type of substances which we employ for flavoring are the diketones, such as diacetyl, which, when used in very small quantities, have a butter like flavor, but which differ among themselves slightly so that various diketones may be selected in accordance with the particular flavor or shade of flavor desired.

Among the diketones suitable for our purpose are those having four carbons or more, but less than eight carbons in the molecule, such as 2,3 pentadione, 3,4 hexadione, 2,3 hexadione, 3,4 heptadione, and the like. Generally speaking, we have discovered that diketones of the general structure

in which "R" and "R'" are methyl, ethyl, or propyl groups, and the total amount of carbon atoms in "R" and "R'" is two or more, but less than six, and in which the carbonyl groups are adjacent to each other, are suitable for use as flavoring substances for cheese. We have also found that these substances may be mixed or blended to modify the flavor, and the blended mixture used as a flavoring agent for cheese. For example, three parts of diacetyl, with one part of 2,3 pentadione dissolved in a suitable solvent and added as a flavoring to a cheese product in very satisfactory for certain types of cheese.

We have also found that three parts of diacetyl, one-half part of 2,3 pentadione, and one-half part of 2,3 hexadione, is a very satisfactory blended combination.

Regarding the specific manner of carrying out the invention, this depends greatly upon the type of cheese being treated. Assuming that the invention is to be applied to a Cheddar type of cheese, we first preferably reduce the micro organisms present in the cheese by the application of heat thereto, generally accompanied with some stirring, the treatment being carried on for a sufficient length of time to produce a pasteurized product wherein the bacteria and enzymes present are greatly reduced in number. This greatly increases the keeping qualities of the product, and this pasteurizing process can of course be carried on to different stages, depending upon the length of time which it is desired to keep the cheese. Following pasteurization or sterilization, as it is sometimes called in the cheese industry, and before the cheese has become solid and immobile, the diketone flavoring substance is added, preferably with a suitable solvent such as plain water or milk, sufficient agitation or other means being employed to insure substantially complete dispersion of the flavoring substance throughout the cheese.

More specifically, assume that a two hundred pound batch of Cheddar type of cheese is being treated. It is first treated to pasteurize it in the manner set forth, and then approximately one-half gram of diacetyl, dissolved in a small amount of water, approximately an ounce, is added thereto. This amount, of course, can be greatly modified, without departing from the invention. In place of water, milk or other liquid substances may be used as a diluent. In the actual introduction of the flavoring substances, we have found that good results are obtainable by spraying with a fine spray while stirring the cheese mass. After the flavoring has been introduced, the cheese is then packed in any of the customary ways.

We have found that we may also add the diketone to the melted cheese during the process of pasterization, but when this process is used, a slightly larger proportion of the flavoring substance is required. The excess amount used will depend to some extent, upon the diketone used, and the temperature to which the cheese is raised, as some of the diketones used in accordance with our invention are more volatile than others.

In carrying out the invention with cottage cheese, the cottage cheese is washed several times with water, thus removing the whey which contains the flavoring constituents as well as the lactic acid producing organisms and enzymes, which are responsible for the ripening of the cheese. This washing, therefore, increases the keeping qualities of the cheese, and incidentally removes substantially all of the flavoring substances. The washed curd is then further treated by the addition thereto of the diketone substances herein above described. We have found that a convenient way of adding the diketones to cottage cheese is first to dissolve a small amount of the diketone substance, either a single diketone or a mixture of diketones, into a suitable proportion of milk, and then to knead the curd in the milk to which the diketone has been added. When carrying out the invention in this way, we took one hundred pounds of washed curd and added .2 to .35 grams of diacetyl to a small amount of milk, and then kneaded the one hundred pounds of washed curd with the milk. This produced a long keeping type of cottage cheese with a very pleasant taste and odor.

We wish to point out that our invention does not depend upon the addition of any particular amount of diketone substance, or any particular combination of diketone substances, to cheese. The specific amounts used will depend on many factors, and will be governed largely by personal taste. In the case of Cheddar cheese for example, the amount used will depend to some extent upon the degree of pasteurization of the cheese, and the amount of the original flavoring constituents which were driven off during the heating.

An advantage of the invention is that the degree of pasteurization may be greatly increased when practicing our invention, because there is no great need for guarding against the loss of flavor during the pasteurization, as has been the case heretofore. For example, the cheese can be heated until substantially all organisms of any type are destroyed, and so the keeping qualities of the cheese will be increased very greatly. The subsequent addition to this cheese of a suitable combination of diketones will then restore to the pasteurized cheese not only the flavor which was lost by the pasteurizing process, but will actually improve the flavor over that existing before the pasteurizing process.

Although the process of our invention is preferably carried out with a pasteurizing of the cheese as a first step, it is obvious that there are certain cases in which it will not be necessary to pasteurize as a first step, but the flavoring substances can be added directly to the untreated cheese. We have even found that we can treat the cheese during the ripening process with the substances of our invention, and the finished product will have a taste and odor superior to that of the product which has not been treated before ripening with the substances of our invention.

We have referred hereinabove to cheese of the Cheddar and cottage types. It is obvious that our invention is adapted for use with substantially all types of cheese products, either of comparatively pure types, or of blended variety. The invention can also be applied to the type of cheese product now attaining some degree of popularity, which is in the nature of a blended cheese, but wherein other edible substances are added. The term cheese, therefore, as used in the claims, is meant to include blended cheese products of these types.

What we claim is new and desire to protect by Letters Patent of the United States is:—

1. A process of treating cheese which includes the step of adding thereto a relatively small quantity of a diketone.

2. A process for treating cheese, which includes the step of adding thereto a diketone of the general structure

in which "R" and "R'" are methyl, ethyl, propyl or other groups, and the total number of carbon atoms in both groups is not less than 2 nor more than 6, and in which the carbonyl groups are adjacent to each other.

3. A process for treating cheese, which includes reducing the number of organisms in the cheese, and adding to the cheese a diketone of the general structure

in which "R" and "R'" are methyl, ethyl, propyl or other groups, and the total number of carbon atoms in both groups is not less than 2 nor more than 6, and in which the carbonyl groups are adjacent to each other.

4. A process for treating cheese which includes heating the cheese to reduce the number of organisms therein, and adding to the cheese a diketone of the general structure

in which "R" and "R'" are methyl, ethyl, propyl, or other groups having a total number of carbons not less than 2 nor more than 6, and in which the carbonyl groups are adjacent to each other.

5. A process for treating cottage cheese which includes washing the cheese to remove a portion of the micro organisms therefrom and adding to the cheese a diketone having the general structure

in which "R" and "R'" are methyl, ethyl, propyl, or other groups having a total number of carbons not less than 2 nor more than 6, and in which the carbonyl groups are adjacent to each other.

6. A process for treating cheese which includes the step of adding to the cheese a relatively small amount of diacetyl.

7. A process for treating cheese which includes the step of adding thereto a mixture of two or more diketones of the general structure

in which "R" and "R'" are methyl, ethyl, propyl, or other groups having a total number of carbons not less than 2 nor more than 6, and in which the carbonyl groups are adjacent to each other.

8. As a new article of commerce, a cheese product with a reduced amount of bacteria and enzymes and containing added small proportions of a diketone having the general structure

in which "R" and "R'" are methyl, ethyl, propyl, or other groups having a total number of carbons not less than 2 nor more than 6, and in which the carbonyl groups are adjacent to each other.

9. As a new article of commerce, a cheese product having a reduced amount of bacteria and enzymes and containing relatively small proportions of diacetyl.

10. As a new article of commerce, a worked curd including a small proportion of a diketone of the general structure

in which "R" and "R'" are methyl, ethyl, propyl, or other groups having a total number of carbons not less than 2 nor more than 6, and in which the carbonyl groups are adjacent to each other.

11. As a new article of commerce, a cottage cheese having the bacteria and enzymes washed therefrom and containing a small amount of a diketone of the general structure.

in which "R" and "R'" are methyl, ethyl, propyl, or other groups having a total number of carbons not less than 2 nor more than 6, and in which the carbonyl groups are adjacent to each other.

12. As a new article of commerce, a cottage cheese having a reduced number of bacteria and enzymes present and including added diacetyl in relatively small proportions.

13. As a new article of commerce, a cheese product having added thereto a relatively small amount of a diketone having the structural formula

in which "R" and "R'" are methyl, ethyl, propyl, or other groups having a total number of carbons not less than 2 nor more than 6, and in which the carbonyl groups are adjacent to each other.

14. A cheese product having added thereto a relatively small amount of diacetyl.

ALBERT K. EPSTEIN.
BENJAMIN R. HARRIS.